United States Patent [19]

Brown

[11] Patent Number: 4,739,898
[45] Date of Patent: Apr. 26, 1988

[54] CLOSURE FOR HOT BEVERAGE CONTAINER

[75] Inventor: Irvin L. Brown, Auburn, Ill.

[73] Assignee: Bunn-O-Matic Corporation, Springfield, Ill.

[21] Appl. No.: 60,458

[22] Filed: Jun. 11, 1987

[51] Int. Cl.[4] ............................................ B65D 51/16
[52] U.S. Cl. ...................................... 220/203; 137/43
[58] Field of Search .................. 220/202, 203, 204; 137/39, 43

[56] References Cited

U.S. PATENT DOCUMENTS

| | | | |
|---|---|---|---|
| 1,724,878 | 8/1929 | Jensen | 220/203 |
| 4,162,021 | 7/1979 | Crute | 220/203 |
| 4,646,772 | 3/1987 | Bergsma | 220/203 |

Primary Examiner—George T. Hall
Attorney, Agent, or Firm—Lockwood, Alex, FitzGibbon & Cummings

[57] ABSTRACT

A closure (e.g. cover, cap, lid, etc.) having anti-evaporation and spill-resistant features for use on a multi-serving capacity (e.g. 1, 1½, 2 gallons) container for hot beverages (e.g. coffee, tea, soup) and near-boiling water and incorporating a filling passageway formation through which hot beverages and water may be introduced to fill a container while the closure is in place thereon. A light-weight floating ball normally seats on the upper side of a filling orifice and minimizes evaporation. A heavy-weight (e.g. steel) ball seats against the opposite side of the orifice and prevents the contents from gushing out in the event the container is overturned.

6 Claims, 2 Drawing Sheets

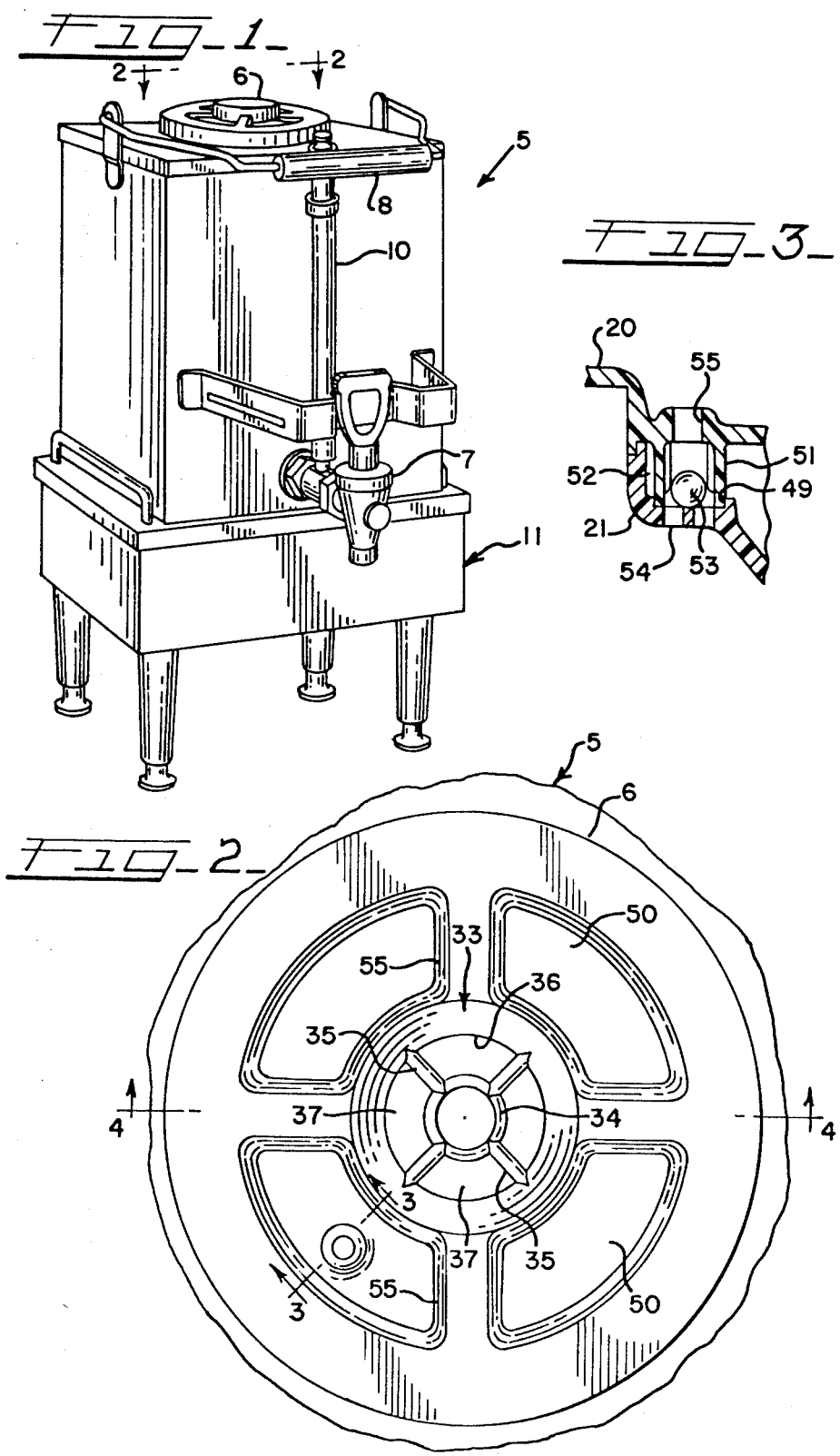

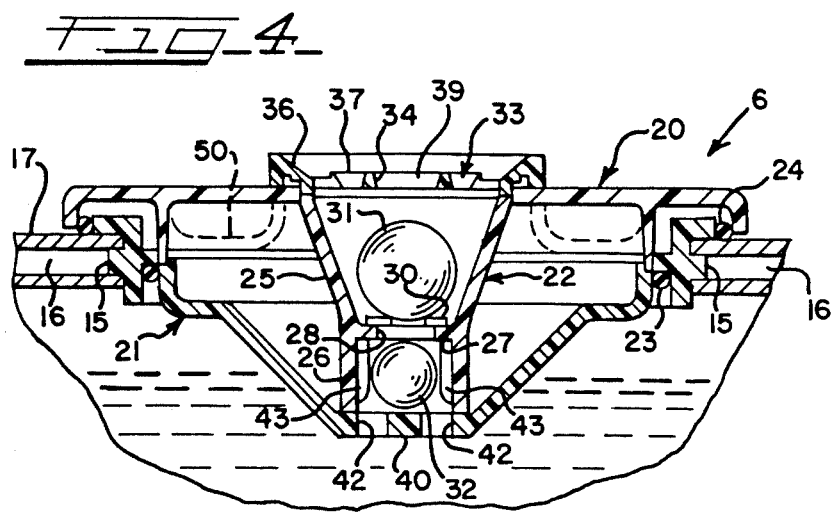
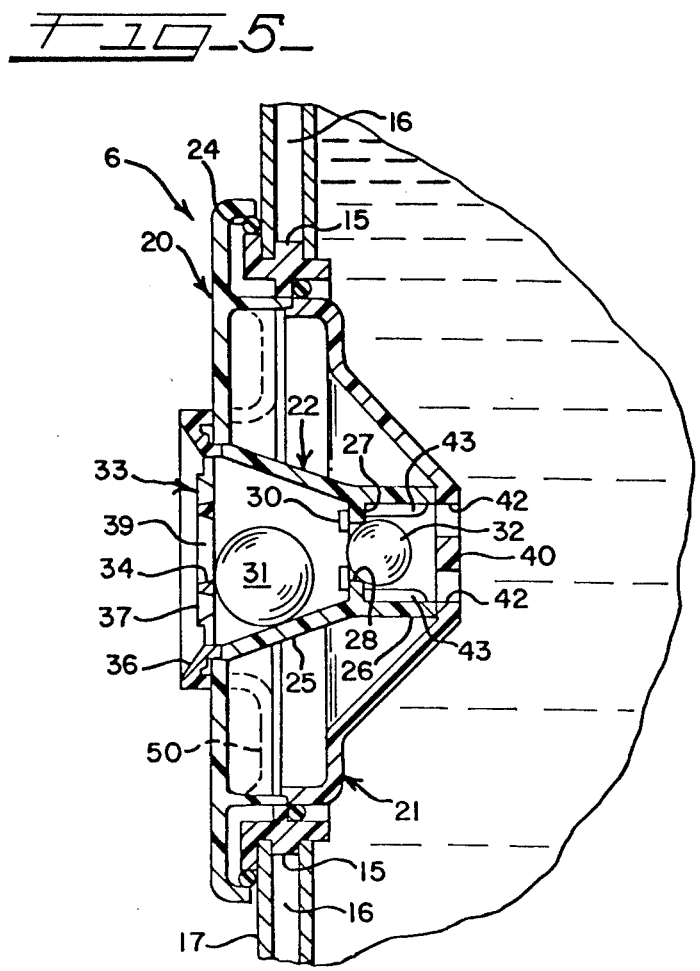

CLOSURE FOR HOT BEVERAGE CONTAINER

This invention relates generally to innovations and improvements in multi-serving containers for hot beverages such as containers of 1, 1½ and 2 gallon capacity for hot coffee, tea, water or soups. The innovations and improvements incorporate anti-evaporation and spill-resistant features into novel closures provided by the invention for such containers.

In restaurants, offices and a variety of institutions there is a need for having hot coffee and other hot beverages including hot water available at separate coffee stations and other locations at a distance from, but accessible to, a coffee brewing machine or other hot beverage source. This need can be served in accordance with the present invention by providing multi-serving capacity (1, 1½, 2 gallons) portable containers or reservoirs which can be filled at a central coffee making machine or other hot beverage or hot water source and then taken to the desired locations in an office restaurant or other facility. For example, a plurality of the containers can be filled and loaded on a cart and then taken around to the various desired locations, such as different serving rooms in a large restaurant or different parts of a large office.

A desirable feature of multi-serving capacity containers for hot beverages of the foregoing type is the ability to fill the same with their closures in place. This allows the previously sanitized containers to be filled in a sanitary manner without debris accidentally falling into the containers or having operators with unclean hands handling the closures when removing and applying the same during the filling operation. Thus, if a container can be filled with its closure in place, and is also provided with a draw-off faucet, the empty container including the closure, can be washed, cleaned and sanitized and made ready for filling. Thereafter, the container can be manipulated by its handle and then filled with hot coffee or other beverage directly from a coffee machine and dispensed through the faucet without the beverage being contacted directly or indirectly by human hands. However, a closure which allows a container to be filled with the closure in place on its container is normally subject to two problems. One problem is the loss of hot contents by way of evaporation through the filling orifice. Another problem is gushing of the hot contents in the event the container is accidentally overturned thereby possibly burning someone and soaking articles in the way of the contents as they gush from the overturned container.

The object of the present invention, generally stated, is the provision of a closure for portable containers of the foregoing type for hot beverages and near-boiling water which permit the containers to be filled while the closures are in place thereon and which closures have the capacity of minimizing or preventing evaporation as well as preventing the contents of the containers from gushing out if the containers are accidentally overturned. The present invention is capable of fulfilling the foregoing object in a safe, reliable, troublefree manner by incorporating in the closure a filling passageway which includes an orifice one side of which serves as a seat for a floating ball and the other side of which serves as a seat for a heavy non-floating ball which provides a plugging action for the orifice if a container is accidentally overturned. The floating ball minimizes or prevents evaporation with loss of taste and aroma through the orifice when a container is in its upright position. The heavy-weight ball resists spilling by preventing the hot contents from gushing out of the container when it is dropped or overturned.

Certain other and more specific objects of the invention will be apparent to those skilled in the art from the following detailed description of a presently preferred embodiment of the invention taken in connection with the accompanying drawings, wherein:

FIG. 1 is a front perspective view of a hot beverage dispensing container mounted on a warming stand permitting individual servings to be drawn off through a faucet;

FIG. 2 is a fragmentary plan view on enlarged scale taken on line 2—2 of FIG. 1 showing the closure for the container;

FIG. 3 is a fragmentary detailed sectional view of a venting feature taken on line 3—3 of FIG. 2;

FIG. 4 is a fragmentary sectional view taken on line 4—4 of FIG. 2; and

FIG. 5 is a view corresponding to FIG. 4 but showing the condition of the closure when the container is overturned.

In FIG. 1 a multi-serving capacity insulated container of generally known construction is indicated generally at 5 which is provided with a closure 6, made in accordance with the present invention, and a draw-off faucet 7. Desirably the container 5 is also provided with a bale 8 by which it can be lifted and lowered into place and a sight glass 10 permitting ready observation of the amount of contents remaining in the container 5.

In use the serving container 5 is preferably mounted on a stand indicated generally at 11 which preferably is electrically heated so as to keep the contents of the container 5 in heated condition. As will be appreciated, the stand 11 should provide sufficient height so that the conventional cup can be placed underneath the faucet 7 while the faucet is manipulated without the cup having to be hand-held.

Insofar as the present invention is concerned, the serving container 5 may be of known type so long as it has an opening in the top which will accept the closure 6. Reference may now be had to FIGS. 2-5 for a detailed description of the closure 6 and anti-evaporation and spill-resistant or anti-gushing features thereof.

Preferably, the body of the closure 6 is formed from a plastic material of the type that can be readily formed as by injection molding and will have adequate stability with respect to retaining its original dimensions and resistance to the elevated temperatures up to and including the temperature of boiling water. The plastic material also must be one that is approved for use with hot foods. Polysulfone has been used successfully. Various other plastic materials meeting these requirements are well known. Alternatively, the body of the closure 6 can be formed from a metal such as stainless steel, aluminum or brass. The particular closure 6 that is shown is circular and this permits it to be readily inserted into the opening in the top of the container 5 and then rotated into a position in which it is securely attached. It will be understood that with the provision of suitable attaching means the closure 6 could take other shapes or forms such as square or hexagonal.

The closure 6 is secured in place in the opening in the top of the container 5 by means of a plurality (e.g. four) of diametrically opposed ears or flanges 15—15 which are seated in mating grooves 16 provided in the container top 17. The closure 6 is formed in three main parts or sections. One is the top 20, a second is the underside or bottom 21 and the third is a central conduit 22 in which the fill-through, anti-evaporation and spill-resistant features of the closure 6 are incorporated.

Preferably, the closure 6 is provided with two O-ring gaskets 23 and 24 which provide seals in the areas where the closure 6 is secured to the opening in the top 17 and which also assists in securely retaining the closure 6 in tightened relationship on the container 5 while permitting it to be removed with deliberate or intentional application of a moderate force.

The anti-evaporation and spill resistant features of the closure 6 are incorporated in the conduit 22. A further feature of the invention is the venting feature which will be described in connection with FIG. 3.

The conduit 22 has two sections, an upper section 25 which is inverted frusto-conical in configuration and a lower cylindrical section 26. An internal baffle 27 is formed at the juncture of the sections 25 and 26 and provides an internal filling orifice 28. Preferably, the upper side of the baffle 27 is provided with a plurality (e.g. three) of radial integrally formed ridges 30—30 which provide an anti-sticking seat for a relatively light-weight floating ball 31. The bottom side of the baffle 27 provides a seat for a relatively heavy-weight ball 32 against the bottom side of the orifice. The ball 32 may be desirably formed of stainless steel.

The filling or top opening structure at the upper end of conduit 22 is indicated generally at 33 and is foraminous in that it is provided with a integrally formed center ring 34 (FIGS. 3 and 4) from which spokes 35—35 radiate to the outer margin 36 of the opening 33. This structure of the opening 33 provides it with four foramina or openings 37—37 in addition to the center opening 39. The spokes 35 are of such dimension as not to substantially reduce the open area of the opening 33 as provided by the foramina 37 and 39 and also provide an adequate barrier to trap the ball 31 and prevent its inadvertent loss or removal. The bottom 40 of the conduit 22 may also be foraminous in nature by provision therein of a plurality (e.g. four) foramina or openings 42—42. This formation traps the steel ball 32 between the underside of the baffle 27 and the top side of the opening 40 so that it will remain in its secure position.

It will be noted that the relative sizes of the balls 31 and 32 and the chambers in the conduit 22 in which they are trapped are such that both balls are free to move in an axial direction. Preferably, the section 26 is provided with a plurality of vertical guide formations 43—43 which restrict the sidewise movement of the steel ball 32 while providing open vertical passageways on opposite sides of the ball.

Referring to FIG. 4 it will be understood that when a hot liquid such as hot coffee is poured into the opening 33, the light-weight ball 31 will float off from its seat on the baffle 27 and allow the liquid to flow through the orifice 28 into the cylindrical section 26. The liquid will then flow down past the ball 32 in the vertical spaces or chambers intermediate the guides 43 and outwardly through the openings 42. After filling has taken place, the ball 31 will resume its seat as shown in FIG. 4 substantially closing off the orifice 28 and thereby preventing or minimizing loss of contents through evaporation. However, if for some reason a pressure should tend to build up in the container 5, the pressure will be relieved when the ball 31 is forced from its seated position.

The dimensions of the conduit 22 and its component openings are such as to comfortably accommodate the flow volumes of coffee streams discharging from conventional coffee making machines. As a further safety feature, the closure 6 may be provided with a separate spill-resistant vent as shown in FIG. 3. This vent feature is preferably located in one of the four depressions 50—50 integrally formed in the cover section 20. A cylindrical conduit 51 (FIG. 3) is formed on the underside of the cover 20 and extends downwardly into a circular recess or seat 49 provided therefore in the bottom or inner section 21. The interior of the conduit 21 is provided with a plurality of vertical guides 52—52 for a trapped stainless steel ball 53. Normally, the ball 53 rests on the upper side of a foraminous wall 54 formed in the bottom section 21. By providing the upper or top 20 with a smaller diameter opening 55, it will be seen that the steel ball 53 is trapped in this vent structure so that it cannot be accidentally lost or displaced. It will be understood if there is a buildup of excessive pressure within a container 5 on which the closure 6 is seated and sealed, this excess pressure will be relieved by the steel ball 53 lifting from its seat and allowing the gases to escape upwardly through the conduit 51.

The depressions 50 in the top wall 20 are separated by radial ridges 55—55 providing wrenching surfaces which may be used in manually rotating the cover 6 in opposite directions during its placement and removal from the container or reservoir 5.

Preferably, the structure 33 in the center of the top section 20 of the cover 6 is light-colored (preferably white) while the surrounding surface is dark-colored (preferably black). The white or light-colored center serves as a target area to facilitate visual observation that coffee is in the process of being brewed and the filling opening is properly positioned under the brewing funnel.

What is claimed:

1. A closure having anti-evaporation and spill-resistant features for use on a multi-serving capacity container for hot beverages, said closure incorporating therein a filling passageway formation through which hot beverage can be introduced into said container while said closure occupies its closing position thereon;

said filling passageway formation comprising conduit means providing a filling passageway through said closure and having an outer foraminous opening at one end lying in the exposed outer surface of said closure through which hot beverage may be poured and an inner foraminous opening at the opposite end of said passageway lying in the exposed inner surface of said closure, said passageway having an apertured baffle positioned intermediate said outer and inner openings;

a relatively light-weight floatable ball trapped with freedom to move in an axial direction in said passageway between said outer opening and one side of said baffle;

a relatively heavy-weight ball trapped with freedom to move in an axial direction in said passageway between said inner opening and the opposite side of said baffle;

said relatively light-weight floatable ball automatically assuming a seated position on said baffle closing the aperture therein when a container closed by said closure is in its upright position and lifting from said seated position and opening said aperture to relieve excess pressure in said container; and said relatively heavy-weight ball normally resting in a non-passageway-closing position when a container closed by said closure is in its upright position and automatically assuming a seated position against said baffle closing said aperture therein when said container is overturned thereby preventing the contents of said container gushing therefrom.

2. The closure called for in claim 1 incorporating a vent passage formation therein comprising conduit means providing a vent passageway through said closure and having a ball seat intermediate its opposite ends, and a relatively heavy-weight ball trapped with freedom to move axially in said vent passageway, said ball normally occupying a non-seated vent-opening position when a container closed by said closure is in its upright position and automatically assuming a seated vent closing position against said ball seat when said container is overturned.

3. The closure called for in claim 1 wherein said relatively heavy-weight ball in its said normal non-passageway-closing position rests on said inner foraminous opening.

4. The closure called for in claim 1 wherein said filling passageway formation occupies the center of said closure.

5. The closure called for in claim 1 wherein the exposed surface of said outer foraminous opening is white or light-colored and the surrounding exposed surface of said closure is black or dark-colored.

6. The closure called for in claim 1 wherein the top surface contains a plurality of depressions separated by radial ridge which provide wrenching surfaces facilitating manual operation and removal of said closure.

* * * * *